(12) United States Patent
Perez et al.

(10) Patent No.: US 8,777,470 B2
(45) Date of Patent: Jul. 15, 2014

(54) LUMINOUS PARTITION

(75) Inventors: Sylvie Perez, Asnieres (FR); Yves Benkemoun, Rueil-Malmaison (FR); Patrick Truquin, Senlis (FR); Andre Rivaud, Vaires-sur-Marne (FR)

(73) Assignee: BPB Limited, Coventry (GB)

( * ) Notice: Subject to any disclaimer, the term of this patent is extended or adjusted under 35 U.S.C. 154(b) by 336 days.

(21) Appl. No.: 13/129,537

(22) PCT Filed: Nov. 17, 2009

(86) PCT No.: PCT/FR2009/001314
§ 371 (c)(1),
(2), (4) Date: May 16, 2011

(87) PCT Pub. No.: WO2010/058096
PCT Pub. Date: May 27, 2010

(65) Prior Publication Data
US 2011/0228548 A1    Sep. 22, 2011

(30) Foreign Application Priority Data

Nov. 18, 2008 (FR) .................................. 08 06453

(51) Int. Cl.
*G09F 13/04* (2006.01)

(52) U.S. Cl.
USPC ............................ 362/559; 362/565; 362/576

(58) Field of Classification Search
None
See application file for complete search history.

(56) References Cited

U.S. PATENT DOCUMENTS

| | | | |
|---|---|---|---|
| 3,638,387 A | 2/1972 | Lickliter et al. | |
| 4,234,907 A | 11/1980 | Daniel | |
| 4,391,073 A | 7/1983 | Mollenkopf et al. | |
| 4,852,317 A | 8/1989 | Schiavello et al. | |
| 5,038,534 A | 8/1991 | Pollock | |
| 2004/0047142 A1 | 3/2004 | Goslee | |
| 2005/0135114 A1* | 6/2005 | Shen | 362/565 |
| 2006/0144460 A1 | 7/2006 | Brochier et al. | |
| 2009/0161378 A1* | 6/2009 | Enz | 362/511 |
| 2009/0291606 A1 | 11/2009 | Malhomme et al. | |

FOREIGN PATENT DOCUMENTS

FR  2 859 737 A1  3/2005
FR  2 907 194 A1  4/2008

OTHER PUBLICATIONS

International Search Report, dated Mar. 23, 2010, from corresponding PCT application.

* cited by examiner

*Primary Examiner* — Y My Quach Lee
(74) *Attorney, Agent, or Firm* — Young & Thompson

(57) ABSTRACT

This interior wall includes at least one cladding panel (4) covered with a luminous fabric (6), lying in a substantially vertical plane and having a front face receiving the luminous fabric, a rear face opposite the front face, a bottom edge, and a top edge. The luminous fabric includes optical fibers (7) extending substantially vertically over the front face of the first cladding panel and first ends of which are bent around the bottom edge of the first cladding panel toward its rear face. A casing (8) accommodates light sources and includes connecting elements (10) for the ends of the optical fibers (7) of the luminous fabric bent around the bottom edge of the first cladding panel. The first casing (8) is fastened to the first cladding panel and is supported by feet (20) extending beyond the bottom edge of the first cladding panel.

17 Claims, 3 Drawing Sheets

LUMINOUS PARTITION

BACKGROUND OF THE INVENTION

1. Field of the Invention

The present invention concerns a luminous interior wall. It particularly concerns the means used for assembling and producing such an interior wall.

2. Description of the Related Art

It is known to use a woven fabric, known as luminous fabric, to produce a light source stretched and distributed over the whole of a surface, in contrast to the usual light sources which are either point sources (incandescent lamp, halogen lamp, LED, etc.) or linear sources (neon tube, halogen lamp, etc.). A luminous fabric and its weaving method are disclosed in the document FR-2 859 737, for example. The document FR-2 907 194 for its part discloses sticking a luminous fabric onto a rigid support.

The technical problem behind the present invention is producing an interior wall incorporating at least one luminous panel including a rigid support associated with a luminous fabric. Here it is a question of incorporating a rigid support covered with a luminous fabric into an interior wall with existing constraints in the construction field.

BRIEF SUMMARY OF THE INVENTION

To this end, the present invention proposes an interior wall, characterized in that it includes at least one cladding panel covered with a luminous fabric, said cladding panel constituting a first cladding panel, in that said first cladding panel lies in a substantially vertical plane and has a front face receiving the luminous fabric, a rear face opposite the front face, a bottom edge, and a top edge, in that the luminous fabric includes optical fibers extending substantially vertically over the front face of the first cladding panel and first ends of which are bent around the bottom edge of the first cladding panel toward its rear face, in that a casing, possibly an open casing, referred to as the first casing, on the one hand accommodates the light sources and on the other hand includes connecting means for the ends of the optical fibers of the luminous fabric bent around the bottom edge of the first cladding panel, in that the first casing is fastened to the first cladding panel, and in that the first casing is supported by feet extending beyond the bottom edge of the first cladding panel.

The features described above make it possible to produce an interior wall incorporating at least one luminous cladding panel. It is possible to provide over the whole of an interior wall one, two or more cladding panels covered with luminous fabric. The luminous cladding panels may be on one or both faces of the interior wall. The optical fibers are connected to light sources (possibly a single light source) behind the cladding panel by bending them at the bottom edge of the cladding panel. This makes it possible to have cladding panels with contiguous vertical edges so that a continuous interior wall may be produced with a plurality of cladding panels disposed side by side as in prior art interior walls. In this way the present invention makes it possible to adapt to prior art interior wall structures to produce interior walls that are at least partially luminous. The proposed solution provides for feet to support the casing in which the light sources are located and to which are connected the ends of the optical fibers of the luminous fabric, this casing itself supporting the corresponding cladding panel. Thus this cladding panel does not damage the optical fibers bent underneath it by crushing them by virtue of its own weight.

In a first embodiment, the first casing has an elongate substantially parallelepipedal shape and extends parallel to the bottom edge of the first cladding panel.

In the conventional way, an interior wall has two face-to-face cladding panels. Here the present invention also concerns an interior wall characterized in that it includes a second cladding panel facing the first cladding panel receiving the luminous fabric. In an embodiment of this kind, the first casing advantageously bears on the two cladding panels serving as a spreader between the two cladding panels. However, if the second cladding panel also receives a luminous fabric and also carries on its rear face a casing containing at least one light source cooperating with optical fibers of the corresponding luminous fabric, the casing of the second cladding panel preferably has dimensions such that and is disposed so that it bears against the first casing of the first cladding panel, the two casings thus serving as a spreader between the two cladding panels.

To adapt to each configuration, the feet provided in an interior wall of the invention allow an adjustment in height. In this case, the adjustment means include for example a threaded rod and a nut; the first casing then advantageously has a bottom face perpendicular to the rear face of the first cladding panel to which it is fastened, and said bottom face bears on each nut.

For improved transmission of the weight of the first cladding panel onto the feet, the first casing is advantageously fastened to an angle iron having a first flange on which the bottom edge of the corresponding first cladding panel bears and a second flange extending along the rear face of the corresponding first cladding panel, from its bottom edge as far as the first casing.

To enable a substantially uniform brightness to be obtained over all of the height of the first cladding panel covered by the luminous fabric, the second ends of the optical fibers of the luminous fabric are advantageously bent around the top edge of the first cladding panel toward its rear face, and a second casing, possibly an open casing is provided that on the one hand accommodates light sources and on the other hand includes connecting means for the ends of the optical fibers of the luminous fabric bent around the top edge of the first cladding panel. In such an embodiment, for an interior wall including two facing cladding panels, the second casing advantageously bears on the two cladding panels, serving as a spreader between the two cladding panels.

The cladding panels of an interior wall of the invention may be mounted, like prior art interior walls, between a bottom rail and a top rail.

For the fabric not to be visible when the light sources are turned off and so that the light may be diffused when the light sources are turned on, the luminous fabric is covered by a layer of translucent material, for example.

The cladding panel receiving a luminous fabric may be a sheet of plasterboard, for example.

BRIEF DESCRIPTION OF THE DRAWINGS

Details and advantages of the present invention will become clearer from the following description given with reference to the appended diagrammatic drawings, in which.

DETAILED DESCRIPTION OF THE PREFERRED EMBODIMENTS

Figure 1:
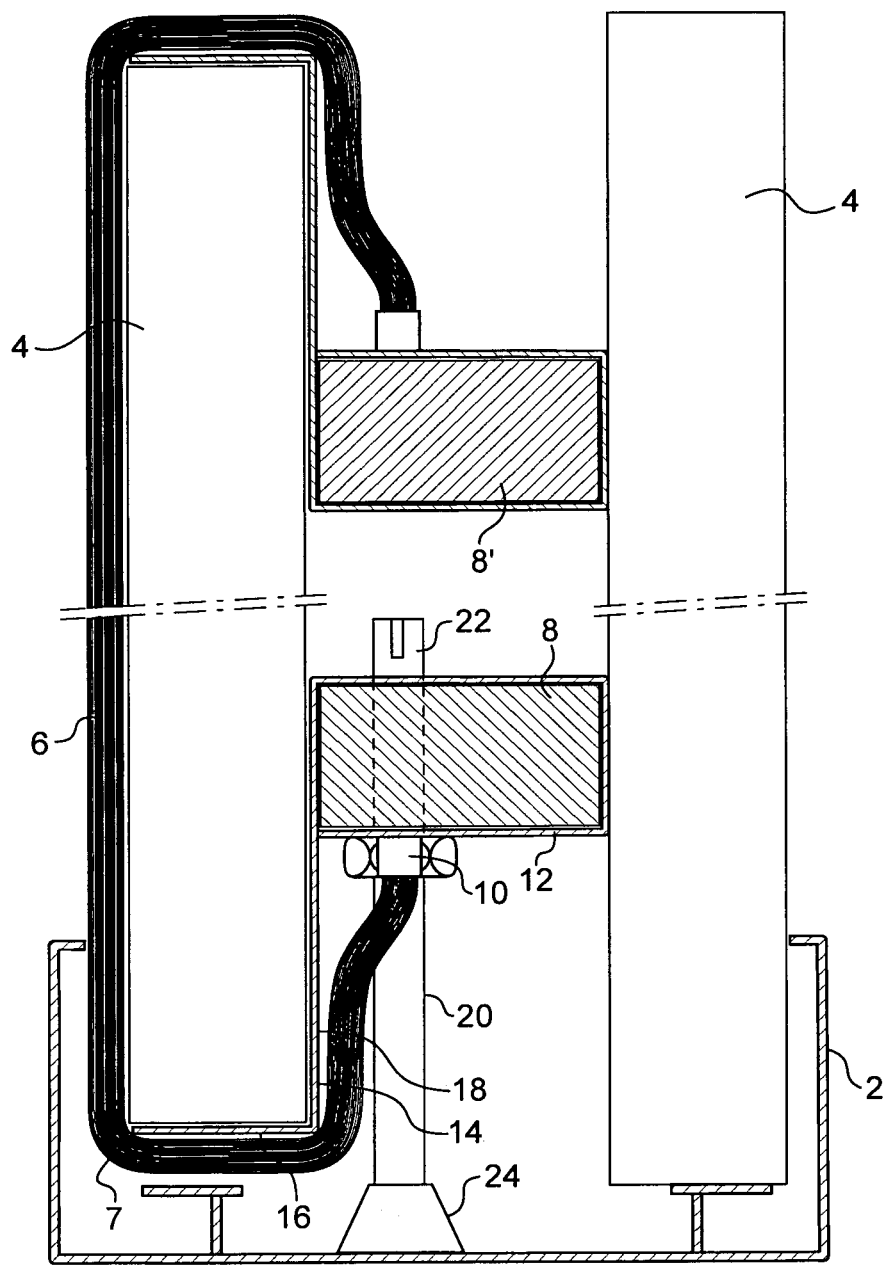
FIG. 1 is a diagrammatic side view of a vertical interior wall on one face of which there is a luminous fabric.

FIG. 1 is a side view of an interior wall of the present invention. In the embodiment shown, the interior wall uses structural sections such as those known to the person skilled in the art for producing demountable interior walls. Such interior walls are for example interior walls known as stud walls marketed under the trademark Clipper. The following description indicates how one face of such an interior wall may be rendered at least partly luminous.

In the conventional way, such an interior wall includes a bottom rail 2, a top rail that is not shown, vertical uprights that are not shown, and cladding panels 4, for example sheets of BA13 plasterboard.

In the embodiment shown in the drawing, a cladding panel 4 is covered on one exterior face with a luminous fabric 6.

In this embodiment, the warp threads of the luminous fabric 6 are optical fibers 7. They project from the surface of the luminous fabric in order for each to be connected to a light source (not shown). Alternatively, the optical fibers could be weft threads of the luminous fabric.

In the embodiment shown, the optical fibers 7 are bent at the bottom of the corresponding cladding board 4 around its bottom edge and are connected to the light sources that are located behind the corresponding cladding panel 4. The light sources are disposed in a housing defined inside a first casing 8. They are light-emitting diodes (LEDs), for example. The optical fibers 7 are connected by screw-on connectors 10 of a type known to the person skilled in the art to a bottom plate 12 of the first casing 8.

The first casing 8 is fixed, for example stuck, to the rear face of the cladding panel 4 carrying the luminous fabric 6. Here the front face of the cladding panel 4 is the face carrying the luminous fabric 6 and the rear face of this cladding panel 4 is the face opposite the front face. The first casing 8 is for example produced by means of a structural section and possibly has a lid. In a preferred embodiment shown in the drawings, it has an elongate parallelepiped shape and is parallel to the bottom edge of the corresponding cladding panel 4.

The first casing 8 is fastened to an angle-iron 14. This has two flanges: a first flange 16 serves as a support for the cladding panel 4 and the bottom edge of the latter rests on this first flange 16. For its part the second flange 18 connects the casing 8 to the first flange 16 and extends along the rear face of the cladding panel 4.

Figure 2:
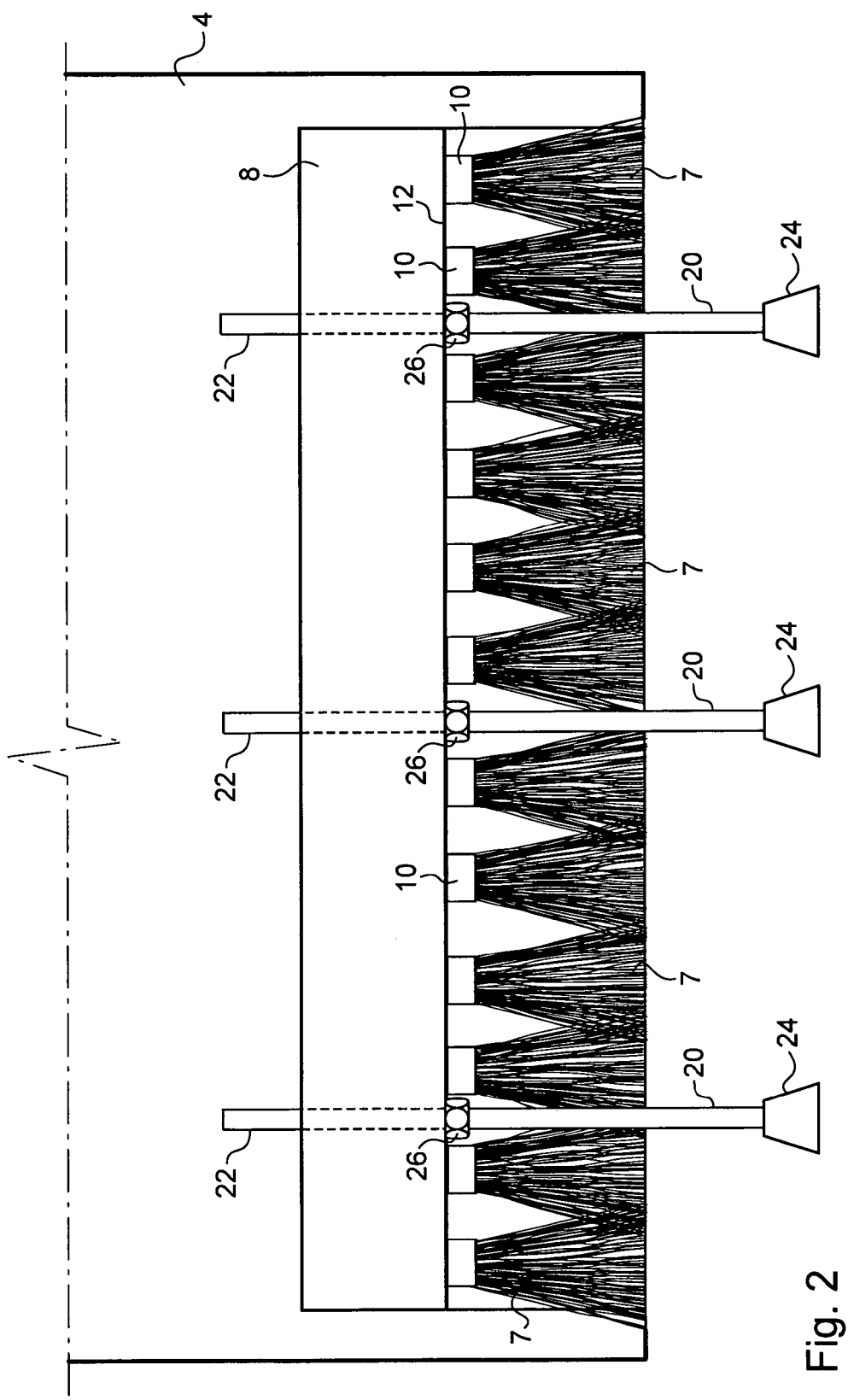
FIG. 2 is a diagrammatic view of the rear face of the support shown in FIG. 1 and carrying the luminous fabric as well as mounting means.

As shown in the figures, notably in FIG. 2, the first casing 8 is carried by feet 20. Each foot 20 includes a threaded rod 22 passing through the first casing 8 and a bearing base 24. A nut 26 bearing on the bottom face 12 of the casing enables the feet 20 to support the first casing 8. The latter being fastened to the angle-iron 14 the first flange 16 of which supports the corresponding cladding panel 4, the feet 20 thus support the combination of the cladding panel 4 and the first casing 8 containing the light sources. As may be seen in the drawings, if the optical fibers 7 are bent around the bottom edge of the cladding panel 4, they pass out of the angle-iron 14 (and not between the angle-iron and the cladding panel). As a result, the resulting assembly enables free mounting of the optical fibers 7 without loading them, notably by the weight of the cladding panel 4.

The bases 24 of the feet 20 rest on the inside of the bottom rail 2.

A transformer that is not shown is provided to supply power to the light sources located in the first casing 8. This transformer may be incorporated in the first casing 8 or placed between the two cladding panels 4 forming the interior wall shown. This transformer must be supplied with electrical energy via a wire inside the bottom rail 2, for example.

In a preferred embodiment, the first casing 8 has dimensions such that it can serve as a spreader between the two cladding panels 4 of the interior wall. The second cladding panel 4, carrying no luminous fabric (see FIG. 1), then bears against the first casing 8. Thus the two cladding panels 4 are held in position on the one hand by the first casing 8 and on the other hand by the rails of the interior wall.

Depending on the height of the interior wall, and notably of the height covered with luminous fabric 6, it may be advantageous to have light sources at each end of the optical fiber 7. In this case, as shown in FIG. 1, light sources are also provided in the upper part of the cladding panel 4. They are disposed in a second casing 8' similar to the casing 8. At the top it is optional to associate this second casing 8' with an angle-iron like the angle-iron 14. Using such an angle-iron in the upper part of the cladding panel 4 concerned may nevertheless be envisaged, as shown in FIG. 1.

Thus the optical fibers 7 of the luminous fabric 6 are fed with light both from the top and from the bottom. This makes it possible to achieve a substantially uniform distribution of light over the whole of the surface of the fabric by eliminating the attenuation that could otherwise occur at the ends of the optical fibers far from the light sources.

The presence of a second casing 8' in the upper part of the interior wall also makes it possible to provide a spreader between the two cladding panels 4 in the upper part of the resulting interior wall.

Figure 3:
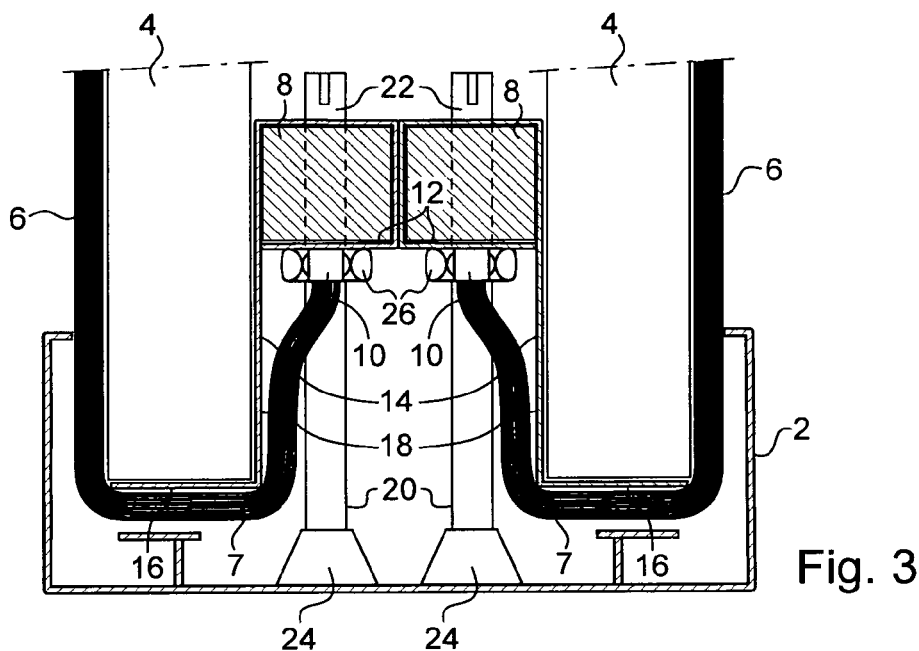
FIG. 3 shows a variant in which both faces of the interior wall carry a luminous fabric.

FIG. 3 shows to a larger scale the bottom of another interior wall of the invention. Compared to the interior wall from FIGS. 1 and 2, this interior wall has two faces at least partially covered with luminous fabric. Thus the interior wall comprises on the one hand a structure comprising the rail 2 shown in FIG. 3 and on the other hand two assemblies each forming a complex comprising a cladding panel 4, a luminous fabric 6 and elements for mounting this cladding panel 4 covered at least partially with the luminous fabric, such as a first casing 8 and feet 20.

Each of these two assemblies has the features described above for an interior wall having only one face at least partially covered with luminous fabric. FIG. 3 shows that the only difference that is apparent concerns the first casing 8. Here the latter is of smaller size than in the FIG. 1 embodiment. For the casing 8 to retain its function of providing a spreader between the two cladding panels 4, its thickness is halved. Here two first casings are placed side by side to form a spreader between the cladding panels 4. Here the first casing 8 therefore has all the functions of the FIG. 1 embodiment.

Figure 4:
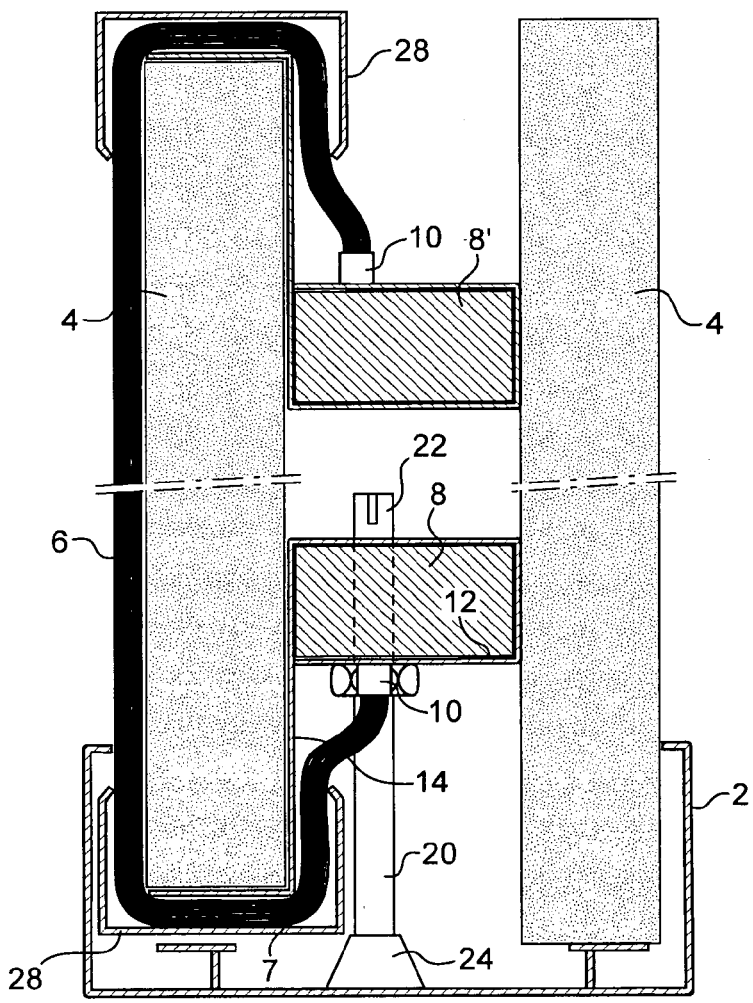
FIG. 4 is a view corresponding to FIG. 1 for a variant.

FIG. 4 shows a variant of the FIG. 1 assembly. In FIG. 1, the luminous fabric 6 is for example stuck to the front face of the corresponding cladding panel 4. In the FIG. 4 embodiment, the luminous fabric 6 is stretched over this front face. It is kept taut by two clamps 28 each of which grips either the top edge or the bottom edge of the cladding panel, clamping the luminous fabric 6 onto the cladding panel 4. Each clamp 28 takes the form of a structural section including a base and two elastic arms. The clamp 28 is such that the distance between the branches when under no load is less than the thickness of the cladding panel plus the thickness of the luminous fabric and the bent optical fibers. To fit the clamp 28, the branches are spread apart and the clamp put into place. When the branches are released, the clamp 28 holds the luminous fabric onto the front face of the cladding panel thanks to the elasticity of the branches.

In the various embodiments referred to above, the luminous fabric 6 can form a large luminous area distributed over the whole of the front face 4. In some cases only part of the luminous fabric is illuminated when the light sources are turned on. Having light appear over only a part of the luminous fabric to represent a drawing, a logo, information, etc. may be envisaged. In this case, to render the pattern intended to be illuminated invisible when the light sources are turned off, it is proposed to cover the luminous fabric 6 with a translucent layer. This may be for example a layer of paper the color of which corresponds to the color of the luminous fabric, for example. It may instead be a sheet of synthetic material produced in a material diffusing light. Other materials may be envisaged, for example a thin fabric.

The various embodiments described above make it possible to fit a luminous fabric to an interior wall of known type. The solution proposed above is incorporated in a "standard" interior wall framework system. This facilitates fitting and limits fitting costs.

The use of such a system also makes it possible to obtain a demountable assembly allowing maintenance of components inside the interior wall, between the cladding panels 4.

The assembly proposed above makes it possible to avoid damaging the optical fibers by preventing mechanical loading thereof, notably by the weight of a cladding panel.

The casing used at the bottom to accommodate the light sources also makes it possible on the one hand to support the corresponding cladding panel and on the other hand to define the distance from another cladding panel forming the interior wall. At the top, the structural section accommodating the light sources also maintains the separation between the cladding panels of the interior wall.

The present invention is not limited to the embodiment and the variants thereof described above by way of nonlimiting example. It equally concerns all variants evident to the person skilled in the art within the scope of the following claims.

Thus using a luminous fabric of a type different from that described above is not outside the scope of the invention. The support for this fabric may equally be different from a sheet of plasterboard. Any rigid support able to be integrated into the production of an interior wall, for example a melamine-faced panel, could also be suitable.

The above description relates in particular to an interior wall framework sold under the trade mark Clipper. However, the invention applies equally to other frameworks, and preferably demountable and/or removable interior wall frameworks.

The invention claimed is:

1. An interior wall, comprising:
   at least one cladding panel covered with a first luminous fabric, the cladding panel being a first cladding panel the first cladding panel lying in a substantially vertical plane and having a front face receiving the first luminous fabric, a rear face opposite the front face, a bottom edge, and a top edge, the luminous fabric including optical fibers extending substantially vertically over the front face of the first cladding panel, first ends of the optical fibers being bent around the bottom edge of the first cladding panel toward the rear face; and
   a first casing, which is an open casing, accommodating light sources and including connecting means for connecting the ends of the optical fibers of the luminous fabric bent around the bottom edge of the first cladding panel, the first casing being fastened to the first cladding panel and being supported by feet extending beyond the bottom edge of the first cladding panel.

2. The interior wall according to claim 1, wherein the first casing has an elongate substantially parallelepipedal shape and extends parallel to the bottom edge of the first cladding panel.

3. The interior wall according to claim 1, further comprising a second cladding panel facing the first cladding panel receiving the luminous fabric, the first casing bearing on the two cladding panels and serving as a spreader between the two cladding panels.

4. The interior wall according to claim 3, wherein the second cladding panel receives a second luminous fabric and carries on a rear face thereof a second casing containing at least one light source cooperating with optical fibers of the corresponding second luminous fabric, and the second casing of the second cladding panel has dimensions such that and is disposed so that the second casing bears against the first casing of the first cladding panel, the two casings thereby serving as a spreader between the two cladding panels.

5. The interior wall according to claim 1, wherein the feet allow height adjustment.

6. The interior wall according to claim 5, wherein each of the feet includes a threaded rod and a nut, and
   the first casing has a bottom face perpendicular to the rear face of the first cladding panel to which the first casing is fastened, the bottom face bearing on each nut.

7. The interior wall according to claim 1, wherein the first casing is fastened to an angle iron having a first flange on which the bottom edge of the corresponding first cladding panel bears and a second flange extending along the rear face of the corresponding first cladding panel, from the bottom edge as far as the first casing.

8. The interior wall according to claim 3, wherein second ends of the optical fibers of the first luminous fabric are bent around the top edge of the first cladding panel toward the rear face of the first cladding panel, and
   an open casing constituting a top casing accommodating light sources and including connecting means for connecting the ends of the optical fibers of the luminous fabric bent around the top edge of the first cladding panel.

9. The interior wall according to claim 8, wherein the top casing bears on the two cladding panels serving as a spreader between the two cladding panels.

10. The interior wall according to claim 3, wherein the cladding panels are mounted between a bottom rail and a top rail.

11. The interior wall according to claim 1, wherein the first luminous fabric is covered by a layer of translucent material.

12. The interior wall according to claim 1, wherein the first cladding panel associated with the first luminous fabric is a sheet of plasterboard.

13. The interior wall according to claim 2, further comprising a second cladding panel facing the first cladding panel receiving the luminous fabric, the first casing bearing on the two cladding panels and serving as a spreader between the two cladding panels.

14. The interior wall according to claim 2, wherein the feet allow height adjustment.

15. The interior wall according to claim 2, wherein the first casing is fastened to an angle iron having a first flange on which the bottom edge of the corresponding first cladding panel bears and a second flange extending along the rear face of the corresponding first cladding panel, from the bottom edge as far as the first casing.

16. The interior wall according to claim 1, wherein the second ends of the optical fibers of the first luminous fabric are bent around the top edge of the first cladding panel toward the rear face of the first cladding panel, and an open casing constituting a top casing accommodating light sources and including connecting means for connecting the ends of the optical fibers of the luminous fabric bent around the top edge of the first cladding panel.

17. The interior wall according to claim 1, wherein the feet support the casing above a floor of the interior wall to provide a space between the optical fibers bent around the bottom edge of the first cladding panel to prevent the cladding panel from providing a load on the optical fibers by weight of the cladding panel against the floor.

* * * * *